United States Patent
Ono et al.

(10) Patent No.: US 7,066,164 B2
(45) Date of Patent: Jun. 27, 2006

(54) ENGINE, ENGINE EXHAUST TEMPERATURE CONTROLLING APPARATUS, AND CONTROLLING METHOD

(75) Inventors: Yoshiharu Ono, Yokohama (JP); Satoru Goto, Ohta (JP); Yoshifumi Nishi, Ohta (JP); Sadao Nakayama, Ohta (JP)

(73) Assignee: Niigata Power Systems Co., Ltd. (JP)

( * ) Notice: Subject to any disclaimer, the term of this patent is extended or adjusted under 35 U.S.C. 154(b) by 0 days.

(21) Appl. No.: 10/415,047

(22) PCT Filed: Aug. 29, 2002

(86) PCT No.: PCT/JP02/08728

§ 371 (c)(1),
(2), (4) Date: Apr. 23, 2003

(87) PCT Pub. No.: WO03/018981

PCT Pub. Date: Mar. 6, 2003

(65) Prior Publication Data
US 2004/0003805 A1    Jan. 8, 2004

(30) Foreign Application Priority Data
Aug. 29, 2001 (JP) .............................. 2001-259848

(51) Int. Cl.
*F02D 41/14* (2006.01)

(52) U.S. Cl. ..................................................... 123/676
(58) Field of Classification Search ................. 123/673, 123/676, 689
See application file for complete search history.

(56) References Cited

U.S. PATENT DOCUMENTS

| 6,314,952 B1 * | 11/2001 | Turin et al. ................. 123/673 |
| 6,382,198 B1 * | 5/2002 | Smith et al. ................ 123/673 |
| 6,675,787 B1 * | 1/2004 | Damitz et al. .............. 123/673 |

FOREIGN PATENT DOCUMENTS

| JP | 62-186037 | 8/1987 |
| JP | 10-110640 | 4/1998 |
| JP | H10-110640 | 4/1998 |

* cited by examiner

*Primary Examiner*—Erick Solis
(74) *Attorney, Agent, or Firm*—Ostrolenk, Faber, Gerb & Soffen, LLP

(57) ABSTRACT

The present invention has been realized in order to keep the cylinder exhaust temperature of a gas engine within a predetermined range, and thereby prevent the generation of misfire and knocking. In the present invention, in S1, when the number of rotations of the engine is greater than a predetermined number, in S2, the exhaust temperatures of the cylinders are sampled at predetermined intervals, in S3, an average of the exhaust temperatures is calculated, in S4, the load factor at that point is determined, in S5, the average exhaust temperature $T_{ave}$ is compared with the exhaust temperature $T(_n)$ of each cylinder, and it is determined whether the deviation $\Delta T_n$ is greater or smaller than the set deviation $T_{limit}$ for that load factor. When the deviation $\Delta T_n$ is smaller, the exhaust temperature is within the set deviation and there is no need to adjust the fuel spray period, and therefore the sequence returns to S2. When the deviation $\Delta T_n$ is greater, in S6, it is determined whether to increase or reduce the opening period of the electronic fuel spray valve. When increasing the opening period, the sequence shifts to S7, and when reducing the opening period, the sequence shifts to S8. Then, in S9, if the engine exceeds the predetermined number of rotations, the processes of S2 to S6 are repeated; in S9, if the engine is below the predetermined number of rotations, the control operation ceases.

26 Claims, 5 Drawing Sheets

ENGINE, ENGINE EXHAUST TEMPERATURE CONTROLLING APPARATUS, AND CONTROLLING METHOD

BACKGROUND OF INVENTION

1. Field of the Invention

This invention relates to an invention for controlling an electronic fuel spray valve in an engine such as a gas engine, thereby automatically adjusting the exhaust temperatures of cylinders so as to reduce variation between them, and more specifically relates to an engine which can be controlled in this way, and a controlling apparatus and a method for controlling the engine exhaust temperature, which make such control possible.

2. Description of Related Art

In a multi-cylinder engine, the temperatures of the exhausts from the cylinders do not match, and, in engines for commercial use, variation in the exhaust temperatures of the cylinders is presently regulated to less than an average of ±15° C. at a load of 100%. The exhaust temperature of a cylinder which has exceeded this range is adjusted by manually adjusting a gas-adjusting valve of the cylinder, thereby balancing the exhaust temperatures of the cylinders.

However, since the gas-adjusting valve is adjusted at a load of 100%, there is greater variation between the exhaust temperatures of the cylinders at loads other than 100%. Furthermore, even at a load of 100%, the set value of the gas-adjusting valve deviates from its initial setting as years pass, so that the set value may require readjustment. Unless this deviation in the set value due to the passage of time is dealt with, variation in the exhaust temperatures of the cylinders will greatly increase, causing misfire and knocking.

Such misfire and knocking leads to considerable disadvantages when, for example, operating a co-generation system. That is, in a co-generation system, when the engine suffers misfire or knocking, the engine output (the amount of electricity generated by the system) is reduced as a first step of human or mechanical safety procedures, and, as a second step, the engine is stopped; the result of reducing the engine output and stopping operating is not only to cease supplying the expected power, but may sometimes be non-profitable, after compensation claims of power contract infringement (demand-over).

Therefore, a technique for automatically controlling the exhaust temperatures in the cylinders, so as to reliably balance the exhaust temperatures in the cylinders while the engine is operational, is desirable. This technique is also important in, for example, safely and stably operating the co-generation system mentioned above.

This invention has been realized in view of the problems described above, and aims to provide an exhaust temperature control technique which can automatically control variation in the exhaust temperatures of the cylinders, and prevent misfire and knocking by keeping the exhaust temperatures of the cylinders within a predetermined range.

DISCLOSURE OF INVENTION

A first aspect of this invention provides an engine comprising a plurality of cylinders, and a plurality of electronic fuel spray valves which supply fuel and are provided in correspondence with these cylinders: the engine having an exhaust temperature measuring unit which measures the exhaust temperatures of said cylinders, and outputs exhaust temperature signals for each of said cylinders; and a control unit which samples the exhaust temperature signals from the exhaust temperature measuring unit at predetermined time intervals, calculates an average exhaust temperature of all the plurality of cylinders, and, in the case where deviation, determined by comparing this average exhaust temperature with the exhaust temperatures of the cylinders, exceeds a predetermined set deviation, controls the opening period of the electronic fuel spray valve of the corresponding cylinder by a predetermined amount of control.

A second aspect of this invention provides an exhaust temperature control apparatus of an engine for supplying fuel via an electronic fuel spray valve to a plurality of cylinders comprising: an exhaust temperature measuring unit which measures the exhaust temperatures of said cylinders, and outputs exhaust temperature signals for each of said cylinders; and a control unit which samples the exhaust temperature signals from the exhaust temperature measuring unit at predetermined time intervals, calculates an average exhaust temperature of all the plurality of cylinders, and, in the case where deviation, determined by comparing this average exhaust temperature with the exhaust temperatures of the cylinders, exceeds a predetermined set deviation, controls the opening period of the electronic fuel spray valve of the corresponding cylinder by a predetermined amount of control.

A third aspect of this invention provides an exhaust temperature control apparatus of an engine which comprising a plurality of cylinders which fuel is supplied to via electronic fuel spray valves, comprising: an exhaust temperature measuring unit which measures the exhaust temperatures of said cylinders, and outputs exhaust temperature signals for each of said cylinders; a load factor measuring unit which detects the load factor of said engine and outputs a load signal; and a control unit which sets a set deviation and control amount in accordance with the load factor of said engine, determines the present load factor of said engine based on the load signal from said load factor measuring unit, samples the exhaust temperature signals from the exhaust temperature measuring unit at predetermined time intervals, calculates an average exhaust temperature of all the plurality of cylinders, and, in the case where deviation, determined by comparing this average exhaust temperature with the exhaust temperatures of the cylinders, exceeds the set deviation in the present load factor, controls the opening period of the electronic fuel spray valve of the corresponding cylinder by a control amount corresponding to the present load factor.

A fourth aspect of this invention provides an exhaust temperature control method of an engine having a plurality of cylinders in which fuel is supplied to from a plurality of electronic fuel spray valves, comprising the steps of: measuring the exhaust temperatures of said cylinders at predetermined time intervals, outputting exhaust temperature signals for each of said cylinders; calculating an average exhaust temperature of all the plurality of cylinders, and, in the case where deviation, determined by comparing this average exhaust temperature with the exhaust temperatures of the cylinders, exceeds a predetermined set deviation, controlling the opening period of the electronic fuel spray valve of the corresponding cylinder by a predetermined amount of control.

A fifth aspect of this invention provides an engine comprising: a plurality of cylinders, a plurality of electronic fuel spray valves which are provided in correspondence with these cylinders and opening period thereof can be controlled by control signals, exhaust temperature measuring units which are provided in correspondence with said plurality of cylinders and output the exhaust temperatures of said cylinders as exhaust temperature signals, and a load factor measuring unit which detects the load factor of the engine and outputs a load signal; wherein a computer which controls said engine being used as a control unit, which sets a set deviation and control amount in accordance with the load factor of said engine, determines the present load factor of said engine based on the load signal from said load factor measuring unit, samples the exhaust temperature signals from the exhaust temperature measuring unit at predetermined time intervals, calculates an average exhaust temperature of all the plurality of cylinders, and, in the case where deviation, determined by comparing this average exhaust temperature with the exhaust temperatures of the cylinders, exceeds the set deviation in the present load factor, controls the opening period of the electronic fuel spray valve of the corresponding cylinder by a control amount corresponding to the present load factor.

DESCRIPTION OF THE PREFERRED EMBODIMENT

A preferred embodiment of this invention will be explained with reference to FIGS. 1 to 6.

Figure 1:
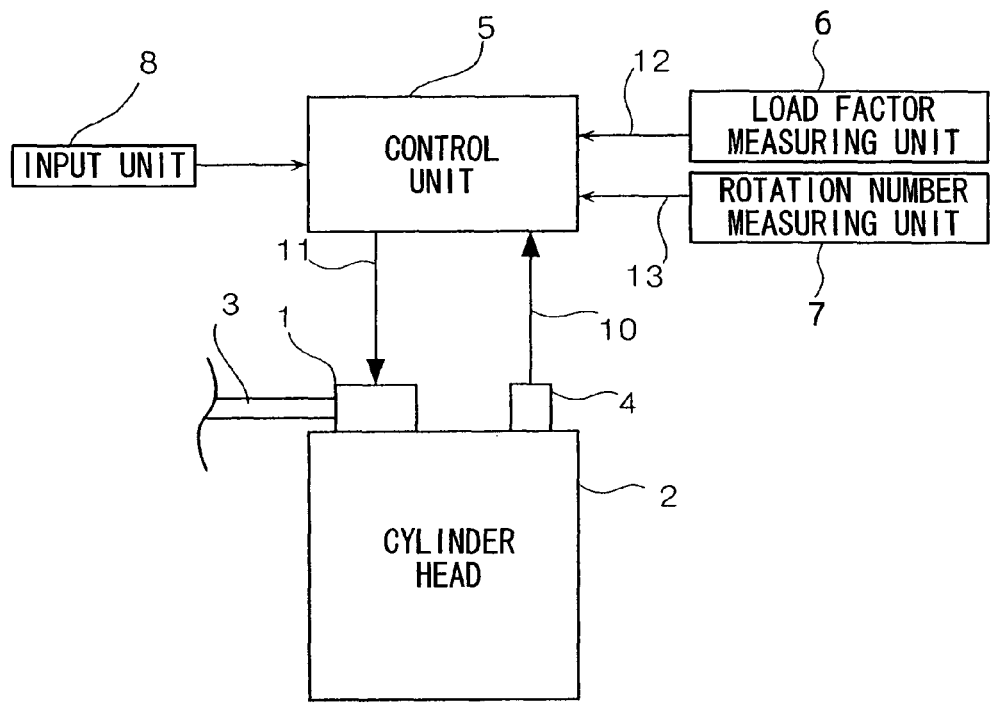
FIG. 1 is a schematic view of an embodiment of this invention.

FIG. 1 is a schematic view of an embodiment of this invention. A gas engine of this invention has a plurality of cylinders. An electronic fuel spray valve 1 is attached to the cylinder head 2 of each cylinder. Each electronic fuel spray valve 1 is connected via a fuel gas pipe 3 to an unillustrated fuel supply source, and supplies gas fuel to a combustion chamber inside the cylinder. Further, an exhaust temperature gauge unit 4 is attached to each of the cylinder heads 2 of the cylinders. The exhaust temperature gauge units 4 measure the exhaust temperature near the exit of each cylinder, and output an exhaust temperature signal 10 to a control unit 5, which is explained later. For example, a temperature gauge such as a pyrometer can be used as the exhaust temperature gauge unit 4. Incidentally, FIG. 1 shows one cylinder, and therefore shows one electronic fuel spray valve 1 and one exhaust temperature gauge unit 4. However in fact, an electronic fuel spray valve 1 and an exhaust temperature gauge unit 4 are attached to each of the plurality of cylinders.

Furthermore, the gas engine of this invention comprises an exhaust temperature control unit 5 (hereinafter abbreviated as "control unit") which controls an opening period of the electronic fuel spray valve 1 in order to keep the exhaust temperature of the cylinders within a predetermined range. The exhaust temperature gauge unit 4 and the electronic fuel spray valve 1 of each cylinder are connected to the control unit 5, and the exhaust temperature signal 10 is input from the exhaust temperature gauge unit 4; in addition, a control signal 11 is output to each electronic fuel spray valve 1, the opening period of each of the electronic fuel spray valves 1 being adjusted so as to keep the exhaust temperature within the predetermined range.

More specifically, a computer, which adjusts the opening period of the electronic fuel spray valves 1 by processing data according to a predetermined sequence described later, and a governor, which has been set so that the same controls as the computer are executed, are used as the control unit 5.

Moreover, the gas engine of this embodiment comprises a load factor measuring unit 6 which measures the load factor of the engine, and a rotation number measuring unit 7 which measures the number of rotations of the engine. These are connected to the control unit 5, and respectively output a load factor signal 12 and a rotation number signal 13 to the control unit 5. The signals 12 and 13 are used as data by the control unit 5 to adjust the opening period of the electronic fuel spray valves 1.

The gas engine of this embodiment is used as an engine for co-generation, and drives an unillustrated electric generator. Therefore, the load of the engine described above corresponds to the generated electrical power, and the load factor signifies the power rate. More specifically, a signal representing the power generated by the electric generator is sent to an unillustrated generator board, and the signal is output as the load factor signal 12 from the generator board to the control unit 5. That is, in the case of this embodiment, the electric generator and the generator board function as the load factor measuring unit 6.

Furthermore, a non-contact type rotation number detecting element using light, provided in the rotation drive section of the engine, can be used as the rotation number measuring unit 7.

An input unit 8 for setting predetermined data required for control is connected to the control unit 5 of the gas engine of this embodiment. The predetermined data required for control comprises the following (1) to (5).

(1) Control Start (End) Number of Rotations [rpm]

This is the number of rotations of the engine when the control starts when the number of rotations exceeds this value, and ends when the number of rotations falls below this value.

(2) Sampling Set Time [sec]

This is the time interval for sampling the exhaust temperature signal, and can be set within a range of 0.1 seconds to 60 seconds in this embodiment.

(3) Set Load [%]

This is the one or more load value which is set as the control split point in controlling this embodiment, eight values of L0 to L7 being set in this embodiment.

(4) Duration Rate $R_{dur}$ [deg·Crank Angle/sec]

This signifies the changing speed of the amount of control which is set in accordance with the values of the set load.

The amount of control represents the opening period (in units of [degCA]) of the electronic fuel spray valve 1, which is directly controlled by the control unit 5 in this embodiment. In this case, a changing amount of the opening period of the valve per a second is shown by the crank angle. For example, 0.1 degCA represents the open angle of the fuel spray valve is increased or decreased with 0.1 degCA in a second.

(5) Set Deviation $T_{limit}$ [° C.]

This is the value which determines the permissible range of the deviation between the actual exhaust temperature of each cylinder at the time of sampling, and the average exhaust temperature of all the cylinders of the gas engine. This value is set independently from the duration rate at each set load.

Figure 2:
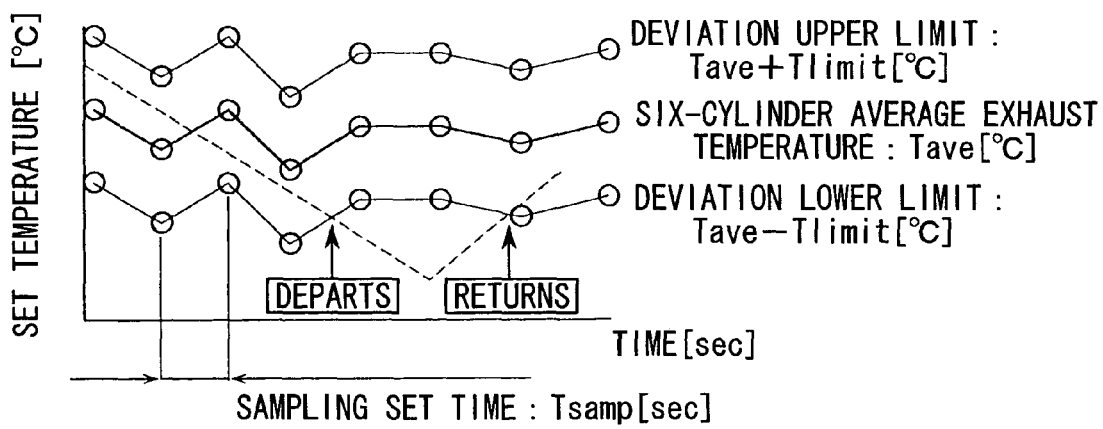
FIG. 2 is a control image diagram illustrating the essential points in controlling the exhaust temperature in the embodiment of this invention.

FIG. 2 schematically shows the control of the exhaust temperature in the engine of this embodiment. The control sequence and function of the control unit 5 in this embodiment will be explained with reference to this figure.

The control unit 5 regularly samples the exhaust temperature of each cylinder and the load of the engine at predetermined time intervals ($t_{samp}$ [seconds]), and determines the set deviation ($T_{limit}$ [° C.]) in accordance with the load; in addition, in the control of this embodiment, the control unit 5 calculates the average exhaust temperature ($T_{ave}$ [° C.]) of all the cylinders.

The deviation upper limit value and deviation lower limit value in FIG. 2 respectively represent (average exhaust temperature $T_{ave}$+set deviation $T_{limit}$) [° C.] and (average exhaust temperature $T_{ave}$–set deviation $T_{limit}$) [° C.]. Even in the case where one of six cylinders departs from the range of the set deviation at a given time, as shown by the broken line in FIG. 2, according to the exhaust temperature control of this embodiment, the exhaust temperature of the cylinder is adjusted to within the range of the set deviation (between the deviation upper limit and deviation lower limit).

Here, in the control shown in FIG. 2, at a sampling set time of, for example, 0.1 seconds, the control unit 5 performs the above calculation every 0.1 seconds. Furthermore, at a sampling set time of sixty seconds, the control unit 5 performs the above calculation every sixty seconds. In this embodiment, the sampling set time is two seconds.

In the above calculation, at each sampling set time, the control unit 5 measures the exhaust temperature at the cylinder exit of each cylinder, calculates the average exhaust temperature of all the cylinders, compares the average exhaust temperature with the actual exhaust temperatures at the cylinder exits of the cylinders, and determines whether the exhaust temperature of each cylinder is below the predetermined set deviation. As mentioned above, this set deviation is the plus-minus (upper limit and lower limit) deviation with respect to the average value of the exhaust temperature. Then, the control unit 5 controls the electronic fuel spray valve 1 of any cylinder where the difference between the average exhaust temperature and the actual exhaust temperature departs from the set deviation.

At the time of controlling the electronic fuel spray valve 1, the opening amount of the electronic fuel spray valve 1 is changed by using the duration rate, and the exhaust temperature of the cylinder being controlled is adjusted so as to be within the set deviation. Incidentally, as described above, the set deviation and the duration rate can be set to different values at each set load.

Figure 3:
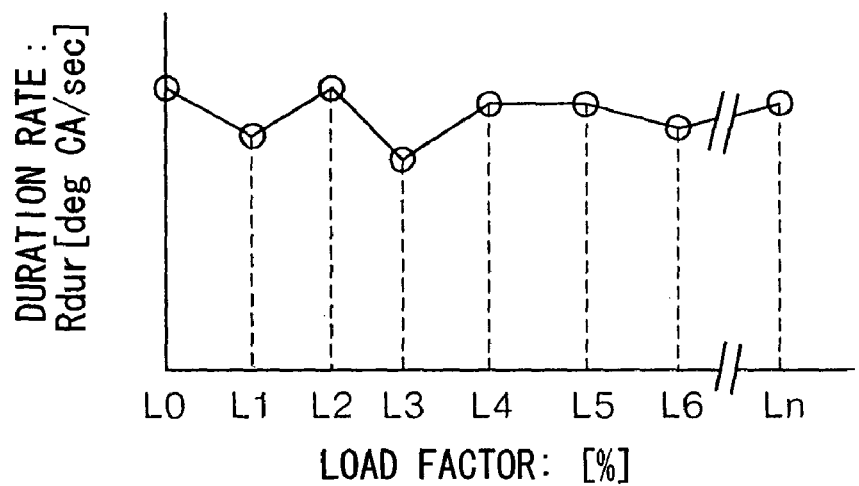
FIG. 3 is an image diagram showing the relationship between load factor and duration rate in the embodiment of this invention.

FIG. 3 shows the relationship between the set load (load factor, horizontal axis) and the duration rate $R_{dur}$ [deg·Crank Angle/sec] (vertical axis). Any number of set loads from $L_0$ to $L_n$ can be set; in this embodiment, n=7 and there are a total of eight set loads. For instance, $L_0$ is set at 0%, $L_1$ at 25%, etc. Furthermore, as shown in FIG. 3, the duration rate between the points of the set loads ($L_0$, $L_1$, . . . ) is set so as to link them in straight lines.

Figure 4:
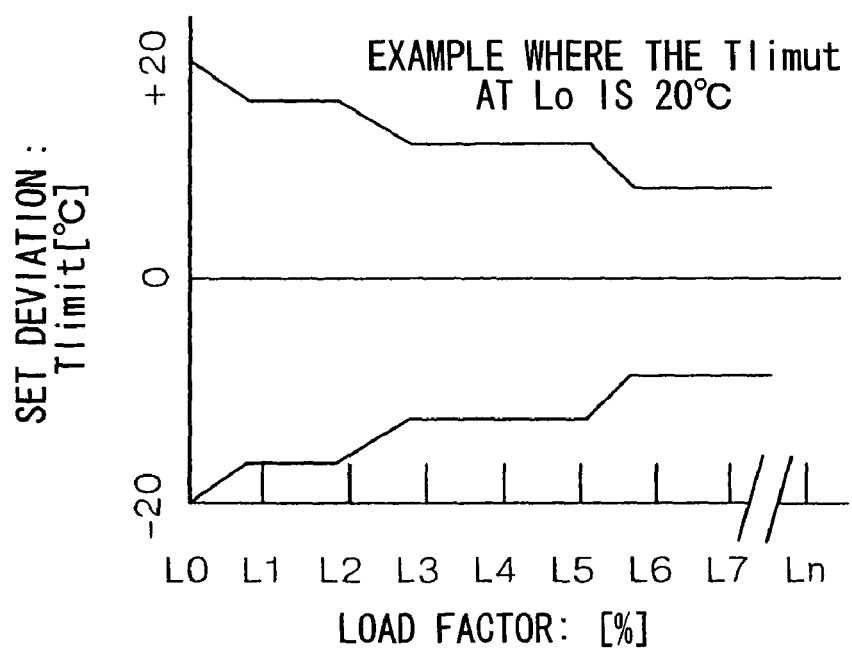
FIG. 4 is an image diagram showing the relationship between load factor and setting deviation in the embodiment of this invention.

FIG. 4 shows the relationship between the set load (load factor, horizontal axis) and the set deviation $T_{limit}$ (vertical axis). Similarly in the case of set deviation, any number of set loads from $L_0$ to $L_n$ can be set; in this embodiment, n=7 and there are a total of eight set loads, as described above. Incidentally, the set loads at this time can be set independently from the set loads of the duration rate. Further, as shown in FIG. 4, each point of the set loads ($L_0$, $L_1$, . . . ) is set so as to link them in straight lines.

Furthermore, when the set deviation is set at 10° C., for example, the permissible range for the average exhaust temperature of the cylinders becomes plus or minus 10° C., and no control is carried out as long as the difference between the actual exhaust temperature and the average exhaust temperature is within this range; control is carried out when the difference is departed from this range.

Figure 5:
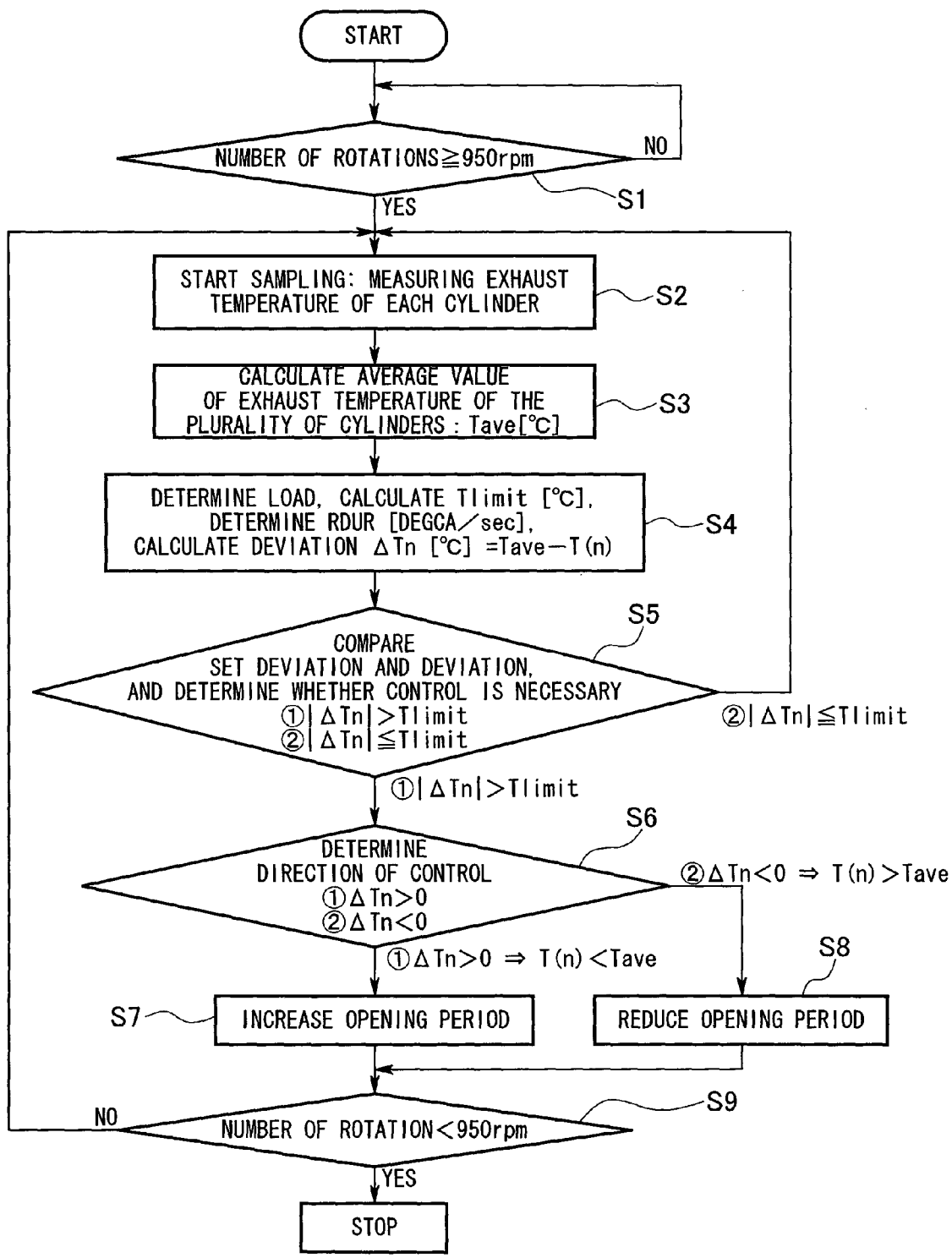
FIG. 5 is a flowchart showing a sequence of controlling the exhaust temperature of an engine in the embodiment of this invention.

FIG. 5 is a flowchart showing a sequence for controlling the exhaust temperature according to a control program which is written in the control unit 5. In FIG. 5, reference numerals S1 to S9 correspond to steps 1 to 9. The control sequence whereby the control unit 5 and the program written therein act in co-operation, and the control functions of the control unit 5 which are thereby realized, will be explained with reference to FIG. 5.

As shown in FIG. 5, after the engine is started, when the control unit 5 starts to operate, in step S1, the control unit 5 detects the number of rotations of the engine based on the rotation number signal 13, output by the rotation number measuring unit. Here, when the number of rotations of the engine is, for example, more than 950 rpm, a control operation is carried out and the sequence proceeds to step S2. On the other hand, when the number of rotations or the engine is below 950 rpm, no control operation is carried out, and step 1 is repeated after an appropriate interval. Incidentally, the number of rotations of the engine at which control should be carried out can be set as desired from the input unit.

In step 2, the control unit 5 starts sampling the exhaust temperature. That is, based on the exhaust temperature signal 10 which was output from the exhaust temperature gauge unit 4, the control unit 5 detects the exhaust temperature of each cylinder at each predetermined sampling set time $t_{samp}$ [seconds].

In step 3, the control unit 5 instantly calculates the average exhaust temperature $T_{ave}$ [° C.] from the exhaust temperatures of the cylinders, input at each sampling set time $t_{samp}$ [seconds].

In step 4, the control unit 5 determines the load factor of the engine from the load factor signal 12, output by the load factor measuring unit 6. Then, from this load factor, the control unit 5 calculates the set deviation $T_{limit}$ [° C.] to determine whether to control the electronic fuel spray valve 1 based on FIG. 4, and in addition, when it has been determined to control the electronic fuel spray valve 1 based on FIG. 3, the control unit 5 calculates the duration rate $R_{dur}$ [deg·CA/sec] to be used. Moreover, the control unit 5 compares the average exhaust temperature $T_{ave}$ [° C.], which was calculated in step 3, with each (maximum of eighteen cylinder, minimum of six cylinders) exhaust temperature $T_{(n)}$ [° C.], and calculates the deviation $\Delta T_n$ [° C.] between them.

In step 5, the control unit 5 determines whether the absolute value $|\Delta T_n|$ of the deviation $\Delta T_n$ [° C.] in the cylinders is greater or smaller than the set deviation $T_{limit}$ [° C.] in the abovementioned load factor, and thereby determines whether to control the electronic fuel spray valve 1 of each cylinder.

In the case where $|\Delta T_n|>T_{limit}$, control is necessary since the exhaust temperature deviation $\Delta T_n$ [° C.] of the cylinder exceeds the set deviation $T_{limit}$ [° C.]. Therefore, the sequence proceeds to the subsequent step 6 (equation (1) in step 5 of FIG. 5). In the case where $|\Delta T_n| \leq T_{limit}$, there is no need to adjust the fuel spray period in the electronic fuel spray valve 1 of the cylinder, since the exhaust temperature deviation $\Delta T_n$ [° C.] of the cylinder is within the set deviation $T_{limit}$ [° C.]. Therefore, the control unit 5 returns to step 2 and repeats the same sequence (equation (2) in step 5 of FIG. 5).

In step 6, the control unit 5 calculates the code of the exhaust temperature deviation $\Delta T_n$[° C.], and determines whether the present exhaust temperature $T_{(n)}$ [° C.] of the cylinder has departed toward the high temperature side or the low temperature side. That is, when $\Delta T_n > 0$ (equation (1) in step 6 of FIG. 5), the exhaust temperature $T_{(n)}$<the average exhaust temperature $T_{ave}$, and it is determined that the present exhaust temperature $T_{(n)}$ [° C.] of the cylinder has departed toward the low temperature side. When $\Delta T_n < 0$ (equation (2) in step 6 of FIG. 5), the exhaust temperature $T_{(n)}$>the average exhaust temperature $T_{ave}$, and it is determined that the present exhaust temperature $T_{(n)}$ [° C.] of the cylinder has departed toward the high temperature side.

Figure 6:
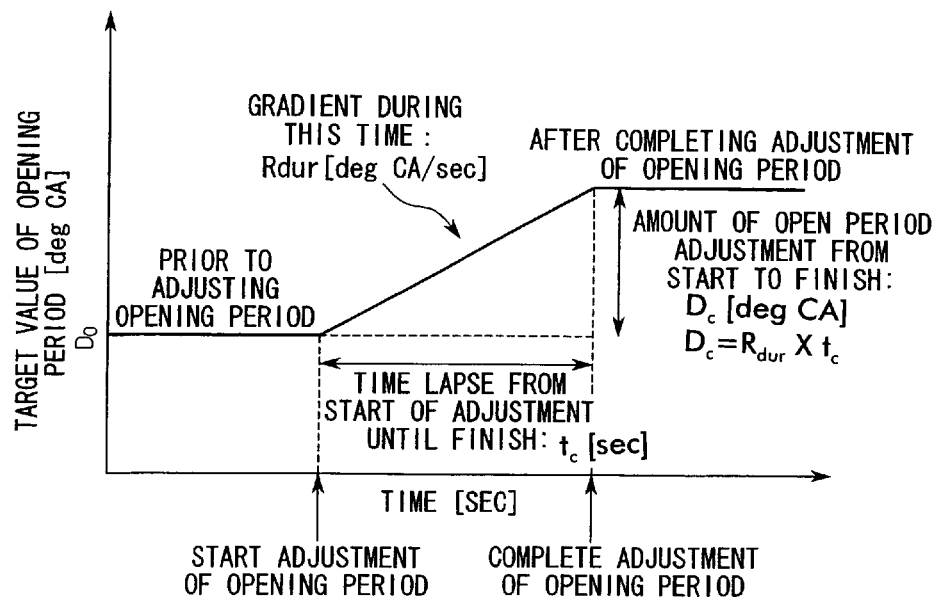
FIG. 6 is a manipulation image diagram of a case where the opening period of an electronic fuel control valve is increased in the embodiment of this invention.

In step 6, when the exhaust temperature $T_{(n)}$ of the cylinder<the average exhaust temperature $T_{ave}$ (i.e. when $\Delta T_n > 0$), the present exhaust temperature of the cylinder has departed from the lower limit value toward the low temperature side, and consequently, the control unit 5 proceeds to step 7, where the exhaust temperature of the cylinder is increased. That is, the control unit 5 uses the duration rate $R_{dur}$ [deg·CA/sec], which is the changing speed of the opening period of the electronic fuel spray valve 1 of the cylinder and is determined in step 4, to calculate a target value for the opening period as shown in FIG. 6, applies the output signal 11 to the electronic fuel spray valve 1, and changes the opening period of the electronic fuel spray valve 1. More specifically, when tc represents the time lapse from determining that control was required in step 5 and passing the loop of steps 9, 2, 3, 4, . . . until it is finally determined in step 5 that control is unnecessary and control is stopped, the target value for the initial value $D_0$ of the opening period of the valve is expressed by the following equation.

Target value of opening period [degCA]=$D_0+D_c$

Here, $D_c$ [degCA]=$R_{dur}$ [degCA/sec]×tc [sec].

Figure 7:
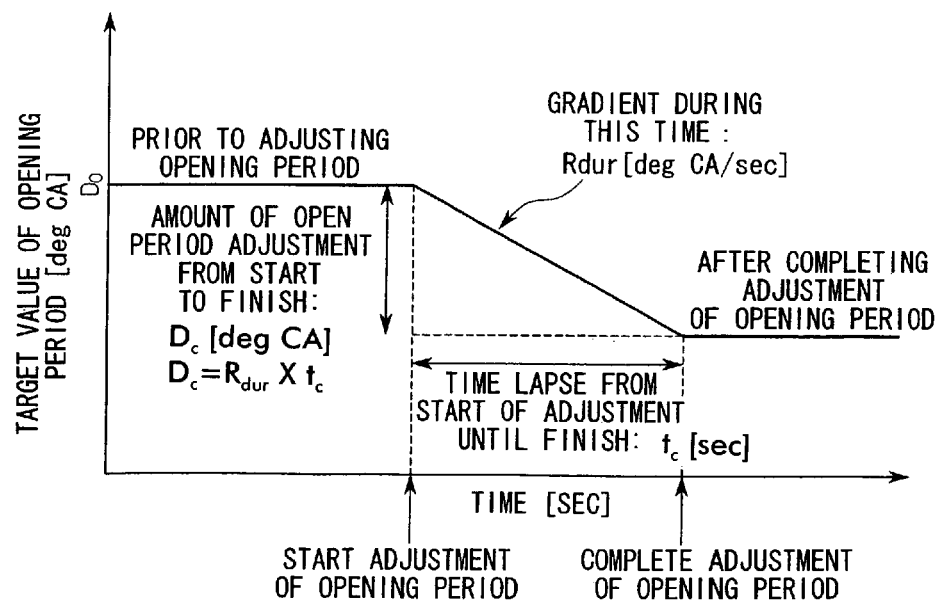
FIG. 7 is a manipulation image diagram of a case where the opening period of an electronic fuel control valve is decreased in the embodiment of this invention.

Furthermore, in step 6, when the exhaust temperature $T_{(n)}$ of the cylinder>the average exhaust temperature $T_{ave}$ (i.e. when $\Delta T_n < 0$), the present exhaust temperature of the cylinder has departed from the higher limit value toward the high temperature side, and consequently, the control unit 5 proceeds to step 8, where the exhaust temperature of the cylinder is decreased. That is, the control unit 5 uses the duration rate $R_{dur}$ [deg·CA/sec], which is the changing speed of the opening period of the electronic fuel spray valve 1 of the cylinder and is determined in step 4, to calculate a target value for the opening period as shown in FIG. 7, applies the output signal 11 to the electronic fuel spray valve 1, and changes the opening period of the electronic fuel spray valve 1. More specifically, when tc represents the time lapse from determining that control was required in step 5 and passing the loop of steps 9, 2, 3, 4, . . . until it is finally determined in step 5 that control is unnecessary and control is stopped, the target value for the initial value $D_0$ of the opening period of the valve is expressed by the following equation.

Target value of opening period [degCA]=$D_0-D_c$

Here, $D_c$ [degCA]=$R_{dur}$ [degCA/sec]×tc [sec].

After the fuel spray amount has been adjusted by adjusting the opening period of the electronic fuel spray valve 1 to keep it within the set deviation during the duration control, (i.e. in step 7 and step 8), in step 9, the control unit 5 detects the number of rotations of the engine in the same manner as in step 1 and, when the number of rotations of the engine is greater than, for example, 950 rpm, the control sequence returns to step 2 and repeats the procedures of steps 2 through 7, and 8. As a consequence, by increasing or decreasing the opening period of the electronic fuel spray valve 1 with the duration rate $R_{dur}$ [degCA/sec], set at each load of the engine, cylinders which have departed from their set deviations are continuously controlled so that their exhaust temperatures are kept within the set deviation. When the number of rotations of the engine is less than 950 rpm in step 9, the control operation stops. Incidentally, the same reference number of rotations is set in step 1 and step 9.

In the control described above, variation in the exhaust temperature is generally greater when at low load, and smaller at high load. When variation in the exhaust temperature at low load is reduced in the same way as at high load, there is a possibility that unwarranted control will diffuse the exhaust temperature (make it non-divergent). Conversely, it is sometimes difficult to carry out control when the duration rate value is high at high load, and the control speed may be reduced when the duration rate value is low at low load. That is, the duration rate has appropriate amount of adjustment which varies according to the load.

To deal with this, the set deviation and duration rate at each load may be changed so that the exhaust temperature remains within an exhaust temperature range which is appropriate for that load. Generally, the set deviation and duration rate tend to increase as the load decreases, and decrease with medium and high load. Since the set deviation and duration rate are independent, there is a merit that precise control appropriate for the load can be performed.

Figure 8:
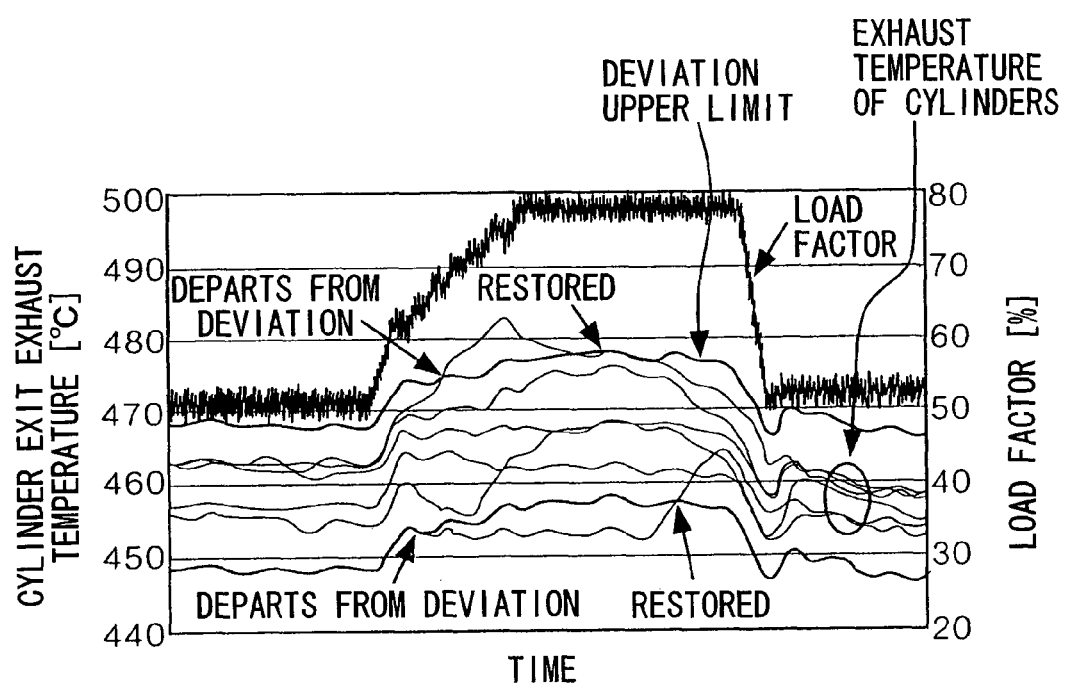
FIG. 8 is a diagram showing an embodiment of changeover time in the exhaust temperature of an engine which has been controlled by this invention.

FIG. 8 is a graph showing effects of controlling the engine according to this embodiment.

In this case, the operational status of the engine is changed from a load factor of 50% to one of 80%, and the load factor is then returned to 50%. The set deviation $T_{limit}$ [° C.] is set to plus or minus 10° C. from the exhaust temperature average value at the cylinder exits of all the cylinders. The duration rate $R_{dur}$ [degCA/sec] is set to 0.05 [degCA/sec] at a load factor of between 50% and 80%.

In FIG. 8, there is a cylinder having an exhaust temperature which has departed from the deviation upper limit and deviation lower limit of the set deviation at the point where the load factor is approximately 65%. Usually, unless controlled, the exhaust temperature would not be restored and the cylinders would operate with unbalanced exhaust temperatures; however, due to the effect of the control, as shown in FIG. 8, the exhaust temperature is thereafter restored to within its normal range. Thus, according to the control, even in circumstances where there is a possibility of variation in the exhaust temperatures, the variation can be automatically corrected, and as a result, knocking and misfire caused by an unbalance in the exhaust temperatures of the cylinders can be prevented.

Incidentally, the engine used in the embodiment described above has a cylinder diameter of 220 mm and six cylinders, but the present invention can achieve similar effects even when the cylinder diameter and number of cylinders are changed. Furthermore, although the duration rate and the set deviation are divided into a total of eight loads, this number can be increased or decreased as necessary.

Furthermore, although this embodiment relates to a gas engine, it can be applied in any other type of gas engine in which the opening period of an electronic fuel spray valve is adjusted in order to control the exhaust temperature.

The invention claimed is:

1. An engine, comprising:
a plurality of cylinders;
a fuel spray valve respectively assigned to each cylinder and controllable to supply a respective amount of fuel to the cylinder;
a control unit for controlling each valve to supply the respective amount of fuel to the cylinder; and
a respective temperature measuring unit assigned to each cylinder and operable to measure a respective exhaust temperature of the cylinder, each temperature measuring unit outputting a respective exhaust temperature signal to the control unit in accordance with the measured respective exhaust temperature;
the control unit is operable to sample the exhaust temperature signals at predetermined time intervals, to calculate an average exhaust temperature of the cylinders in accordance with the sampled exhaust temperature signals, to control the respective fuel spray valve of each cylinder to increase the respective amount of fuel supplied to the cylinder if the sampled exhaust temperature of the cylinder is less than a first temperature which is a first deviation below the calculated average exhaust temperature of the cylinders, to control the respective fuel spray valve of each cylinder to decrease the respective amount of fuel supplied to the cylinder if the sampled exhaust temperature of the cylinder is greater than a second temperature which is a second deviation above the calculated average exhaust temperature of the cylinders, and to control a rate of change of an opening amount of the fuel spray valve per a predetermined period in accordance with a load factor of the engine.

2. The engine of claim 1, wherein the first deviation is equal to the second deviation.

3. The engine of claim 1, wherein the control unit is operable to control the respective fuel spray valve of each cylinder to increase and decrease the amount of fuel supplied to the cylinder by increasing and decreasing, respectively, the opening amount of the fuel spray valve.

4. The engine of claim 1, further comprising a load factor measuring unit operable to measure the load factor of the engine and to communicate a load signal to the control unit in accordance with the measured load factor;
wherein the control unit is operable to control the respective fuel spray valve of each cylinder to vary the amount of fuel supplied to the cylinder in accordance with the load signal communicated by the load factor measuring unit.

5. The engine of claim 1, further comprising a load factor measuring unit operable to measure the load factor of the engine and to communicate a load signal to the control unit in accordance with the measured load factor;
wherein values of the first and second deviations are set in accordance with the load signal communicated by the load factor measuring unit.

6. The engine of claim 5, wherein the control unit is operable to control the respective fuel spray valve of each cylinder to vary the amount of fuel supplied to the cylinder in accordance with the load signal communicated by the load factor measuring unit.

7. The engine of claim 1, further comprising a rotation number measuring unit operable to measure revolutions-per-minute of the engine and to communicate an rpm signal to the control unit in accordance with the measured revolutions-per-minute of the engine;
wherein the control unit does not control the fuel spray valves of the cylinders to increase or decrease the respective amounts of fuel supplied to the cylinders if the rpm signal does not exceed an rpm threshold.

8. The engine of claim 1, wherein the opening amount of the fuel spray valve per the predetermined period is expressed in an opening angle of the fuel spray valve per second.

9. An exhaust system control apparatus for an engine having a plurality of cylinders, comprising:
a fuel spray valve respectively assigned to each cylinder and controllable to supply a respective amount of fuel to the cylinder;
a control unit for controlling each valve to supply the respective amount of fuel to the cylinder; and
a respective temperature measuring unit assigned to each cylinder and operable to measure a respective exhaust temperature of the cylinder, each temperature measuring unit outputting a respective exhaust temperature signal to the control unit in accordance with the measured respective exhaust temperature;
the control unit is operable to sample the exhaust temperature signals at predetermined time intervals, to calculate an average exhaust temperature of the cylinders in accordance with the sampled exhaust temperature signals, to control the respective fuel spray valve of each cylinder to increase the respective amount of fuel supplied to the cylinder if the sampled exhaust temperature of the cylinder is less than a first temperature which is a first deviation below the calculated average exhaust temperature of the cylinders, to control the respective fuel spray valve of each cylinder to decrease the respective amount of fuel supplied to the cylinder if the sampled exhaust temperature of the cylinder is greater than a second temperature which is a second deviation above the calculated average exhaust temperature of the cylinders, and to control a rate of change of an opening amount of the fuel spray valve per a predetermined period in accordance with a load factor of the engine.

10. The exhaust system control apparatus of claim 9, wherein the first deviation is equal to the second deviation.

11. The exhaust system control apparatus of claim 9, wherein the control unit is operable to control the respective fuel spray valve of each cylinder to increase and decrease the amount of fuel supplied to the cylinder by increasing and decreasing, respectively, the opening amount of the fuel spray valve.

12. The exhaust system control apparatus of claim 9, further comprising a load factor measuring unit operable to measure the load factor of the engine and to communicate a load signal to the control unit in accordance with the measured load factor;
wherein the control unit is operable to control the respective fuel spray valve of each cylinder to vary the amount of fuel supplied to the cylinder in accordance with the load signal communicated by the load factor measuring unit.

13. The exhaust system control apparatus of claim 9, further comprising a load factor measuring unit operable to measure the load factor of the engine and to communicate a load signal to the control unit in accordance with the measured load factor;

wherein values of the first and second deviations are set in accordance with the load signal communicated by the load factor measuring unit.

14. The exhaust system control apparatus of claim 13, wherein the control unit is operable to control the respective fuel spray valve of each cylinder to vary the amount of fuel supplied to the cylinder in accordance with the load signal communicated by the load factor measuring unit.

15. The exhaust system control apparatus of claim 9, further comprising a rotation number measuring unit operable to measure revolutions-per-minute of the engine and to communicate an rpm signal to the control unit in accordance with the measured revolutions-per-minute of the engine;

wherein the control unit does not control the fuel spray valves of the cylinders to increase or decrease the respective amounts of fuel supplied to the cylinders if the rpm signal does not exceed an rpm threshold.

16. The exhaust system control apparatus of claim 9, wherein the opening amount of the fuel spray valve per the predetermined period is expressed in an opening angle of the fuel spray valve per second.

17. An exhaust system control apparatus for an engine having a plurality of cylinders and a fuel spray valve respectively assigned to each cylinder and controllable to supply a respective amount of fuel to the cylinder, the apparatus comprising:

a control unit for controlling each valve to supply the respective amount of fuel to the cylinder; and a respective temperature measuring unit assigned to each cylinder and operable to measure a respective exhaust temperature of the cylinder, each temperature measuring unit outputting a respective exhaust temperature signal to the control unit in accordance with the measured respective exhaust temperature;

the control unit is operable to sample the exhaust temperature signals at predetermined time intervals, to calculate an average exhaust temperature of the cylinders in accordance with the sampled exhaust temperature signals, to control the respective fuel spray valve of each cylinder to increase the respective amount of fuel supplied to the cylinder if the sampled exhaust temperature of the cylinder is less than a first temperature which is a first deviation below the calculated average exhaust temperature of the cylinders, to control the respective fuel spray valve of each cylinder to decrease the respective amount of fuel supplied to the cylinder if the sampled exhaust temperature of the cylinder is greater than a second temperature which is a second deviation above the calculated average exhaust temperature of the cylinders, and to control a rate of chance of an opening amount of the fuel spray valve per a predetermined period in accordance with a load factor of the engine.

18. The exhaust system control apparatus of claim 17, further comprising a load factor measuring unit operable to measure the load factor of the engine and to communicate a load signal to the control unit in accordance with the measured load factor;

wherein the control unit is operable to control the respective fuel spray valve of each cylinder to vary the amount of fuel supplied to the cylinder in accordance with the load signal communicated by the load factor measuring unit.

19. The exhaust system control apparatus of claim 17, further comprising a load factor measuring unit operable to measure the load factor of the engine and to communicate a load signal to the control unit in accordance with the measured load factor;

wherein values of the first and second deviations are set in accordance with the load signal communicated by the load factor measuring unit.

20. The exhaust system control apparatus of claim 19, wherein the control unit is operable to control the respective fuel spray valve of each cylinder to vary the amount of fuel supplied to the cylinder in accordance with the load signal communicated by the load factor measuring unit.

21. The exhaust system control apparatus of claim 17, further comprising a rotation number measuring unit operable to measure revolutions-per-minute of the engine and to communicate an rpm signal to the control unit in accordance with the measured revolutions-per-minute of the engine;

wherein the control unit does not control the fuel spray valves of the cylinders to increase or decrease the respective amounts of fuel supplied to the cylinders if the rpm signal does not exceed an rpm threshold.

22. The exhaust system control apparatus of claim 17, wherein the opening amount of the fuel spray valve per the predetermined period is expressed in an opening angle of the fuel spray valve per second.

23. A method for controlling an exhaust temperature of exhaust gasses in an engine, comprising:

measuring the exhaust gas temperatures of the cylinders at predetermined time intervals;

calculating an average exhaust gas temperature in accordance with the measured exhaust gas temperatures of the cylinders;

comparing the measured exhaust gas temperature of each cylinder to the calculated average exhaust gas temperature;

increasing an amount of fuel supplied to the cylinder if the measured exhaust gas temperature of the cylinder is less than a first temperature which is a first deviation below the calculated average exhaust gas temperature of the cylinders;

decreasing the amount of fuel supplied to the cylinder if the measured exhaust gas temperature of the cylinder is greater than a second temperature which is a second deviation above the calculated average exhaust gas temperature of the cylinders; and controlling a rate of change of an opening amount of a fuel spray valve per a predetermined period in accordance with a load factor of the engine while the amount of fuel supplied to the cylinder is changed.

24. The method of claim 23, further comprising:

forming respective exhaust gas signals in accordance with the measured exhaust gas temperatures of the cylinders; and performing the calculating step in accordance with the exhaust gas signals.

25. The method of claim 24, wherein the calculating step is performed by a control unit.

26. The method of claim 23, wherein the opening amount of the fuel spray valve per the predetermined period is expressed in an opening angle of the fuel spray valve per second.

* * * * *